United States Patent [19]

Walker

[11] 4,103,801
[45] Aug. 1, 1978

[54] PRESSURE COOKER WITH MANUALLY-OPERATED COVER INTERLOCK

[75] Inventor: Duane Hubert Walker, Fall Creek, Wis.

[73] Assignee: National Presto Industries, Inc., Eau Claire, Wis.

[21] Appl. No.: 824,421

[22] Filed: Aug. 15, 1977

[51] Int. Cl.² .................. B65D 51/16; B65D 45/00
[52] U.S. Cl. ................................. 220/203; 220/316
[58] Field of Search ........................... 220/316, 203

[56] References Cited

U.S. PATENT DOCUMENTS

| 2,483,297 | 9/1949 | Naylor | 220/203 |
| 2,538,583 | 1/1951 | Morrison, Jr. | 220/203 |
| 3,973,694 | 8/1976 | Tess | 220/316 |

FOREIGN PATENT DOCUMENTS 167,276  3/1959  Sweden ................................. 220/316

Primary Examiner—William Price
Assistant Examiner—Allan N. Shoap

Attorney, Agent, or Firm—Merchant, Gould, Smith, Edell, Welter & Schmidt

[57] ABSTRACT

A pressure cooker has a vent opening in its cover in which a sealing plug rises in response to pressure developed in the cooker and the cover handle has a slidably mounted lock member which is manually movable into an "open" position when its abutment portion overlies the vent opening to prevent rise of the plug and thereby development of pressure within the cooker. The lock member can be moved out of said "open" position into a "cook" position where its abutment portion is clear of the vent opening and the plug is free to rise and seal the vent opening to permit pressure development within the cooker. The lock member, however, has a catch portion which, in the cook position of the lock member, catches with a cooker body handle so that the cover cannot be rotated relative to the cooker body, as is required to remove the cover from the cooker. In the raised or "pressure actuated" position of the sealing plug, its stem prevent return of the lock member to its "open" position and the cover cannot be removed from the cooker.

12 Claims, 8 Drawing Figures

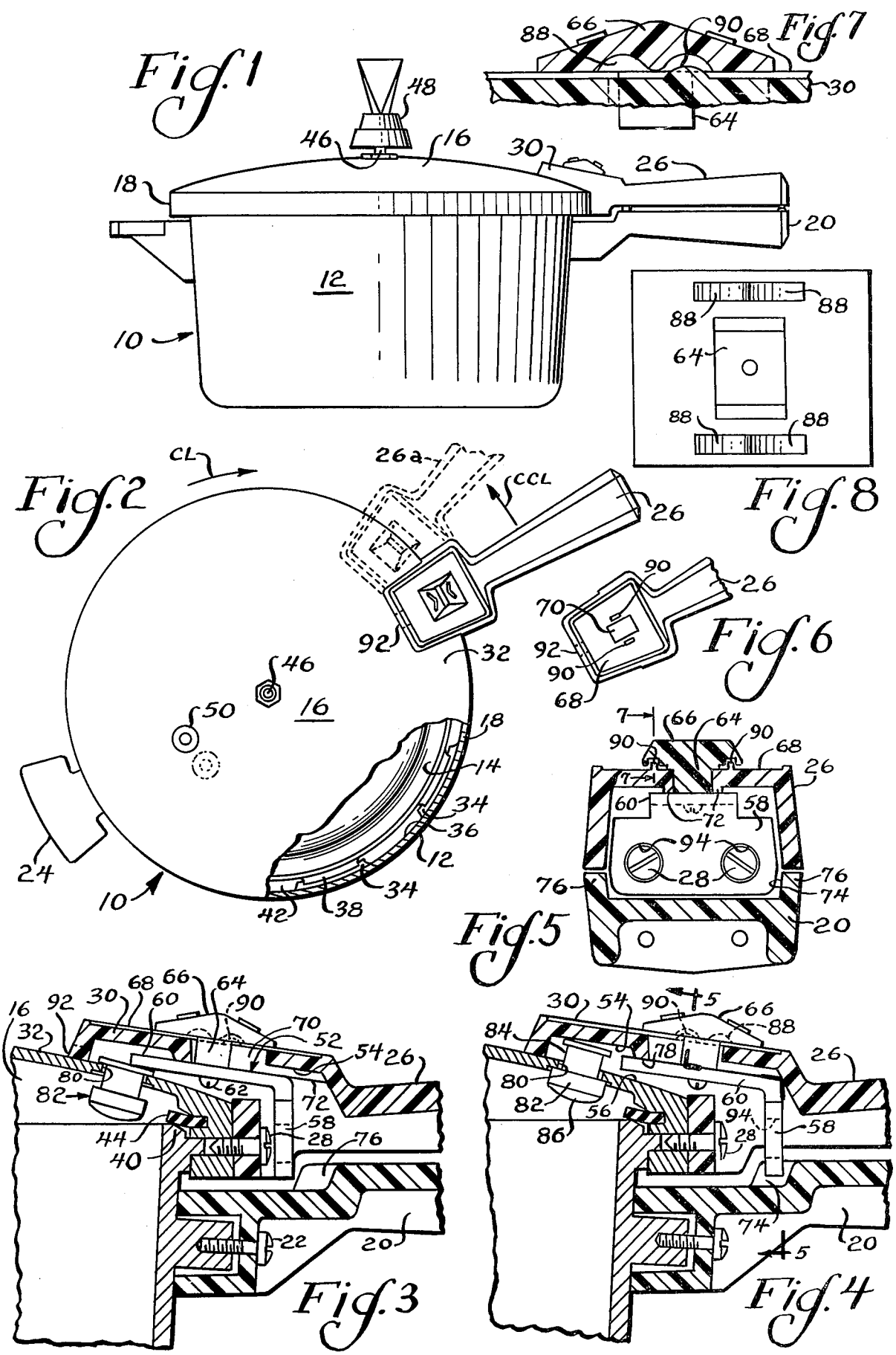

PRESSURE COOKER WITH MANUALLY-OPERATED COVER INTERLOCK

This invention relates to pressure cookers and particularly to those which are utilized in the home to prepare food for the table and includes canners.

Such cookers conventionally consist of a vessel or body having an open top through which water and food to be cooked or jars containing food to be "canned" are loaded. The top is closed by a cover which is releaseably sealed fluid-tight to the cooker body to produce a closed container in which pressure developes when subjected to heat to effect the cooking or canning process.

Conventionally, the cover of such cookers is provided with a vertical vent pipe on which loosely rests a weight to regulate the pressure developed in the cooker during the cooking act. Such cookers commonly also contain a plug, usually in the cover, which is designed to be ejected to relieve pressure within the cooker before it reaches a dangerous level.

In one pressure cooker available commercially, both the cover and the cooker body are provided with circumferentially spaced lugs at their periphery which are interengaged by relative rotation of the cooker body and/or its cover relative to the other, the effect of which is to urge the upper edge of the cooker body against an appropriate located gasket or other resilient member supported by the cover thereover and so as to effect the required fluid tight seal there between.

Pressure cookers including the described type are used by persons of varying skills and understanding of its operation, and who, on occasion, through carelessness or intention, may attempt to remove the cover before the cooker pressure has been reduced to a safe level; or, in the initial assembly of the cover, may imperfectly engage the cover lugs beneath the cooker body lugs. In either instance, the user runs the risk of injury to himself or to others as a consequence of premature or unexpected blow off of the cover.

For these and other reasons, much effort has been expended by manufacturers in an effort to incorporate safety devices in such cookers which would lessen the possibility of injury to the user, and to bystanders or the surrounding environs as well.

For example, in Wittenburg U.S. Pat. No. 2,627,997, there is disclosed a safety lock for pressure cookers wherein the cooker body and cover lugs are provided with one or more relieved areas or recesses which come into play to interrupt cover rotation should a user attempt to separate the cover from the body before the internal pressure in the cooker has dissipated. In the cover rotating act, high portions of one set of lugs catch within relieved areas of the other lugs so as to permit axial separate of the cover from the body which is sufficient to interrupt the seal and allow pressure to escape, but at the same time prevents further relative rotation of the member to an unlocked position until the pressure has subsidided.

In Wyman U.S. Pat. No. 2,614,722, there is disclosed a pressure cooker in which the cover is assembled by locating one-half the circumferential extent of its edge beneath an inwardly turned lip on the cooker body also having an angular extension of 180°. Once in place, the opposite edge is locked by latching a hook on the cover handle beneath a second shorter lip at the opposite side of the cooker. A pin loosely mounted in the cover rises to indicate pressure developing in the cover and pressure is relieved by swinging back a weighted valve which is hinged to the cover handle and in the cooking operation rests on a vent pipe in the cover adjacent said handles. A loosely mounted pin in the cover rises therethrough to indicate the presence of pressure developing in the cooker; and in the illustrated form, also passes through a provided notch in the edge of a lip fixed to the cooker above the cover to prevent opening thereof.

In Steere U.S. Pat. No. 1,208,041, pressure developing in the cooker acts against a diaphram fixed to the underside of the cover. This causes a plunger to rise and force radially extending rods to engage beneath peripheral portions of the cooker kettle and so prevents cover removal. In Saporta U.S. Pat. No. 1,821,726, pressure developing in the cooker acts on a pin causing it to rise into a position where it inhibits loosening of a wing nut utilized to clamp the cover to the kettle.

In one form of a pressure cooker with which this invention has utility, the cooker is sealed fluid tight over and about the open top of the cooker body utilizing circumferentially spaced lugs on the cover which engage beneath similarly located lugs spaced about the cooker body such that, with related rotation of the cover and body, the cover is effectively drawn toward the cooker body and the top edge of the cooker body is forced to effect a seal with a resilient gasket confined interiorly of the cover. Such a method of sealing the cover of a pressure cooker thereto is well-known.

However, in accordance with the invention novel structure is employed which assures, first, that on the initial assembly of the cover on the cooker body, the cover lugs have been properly aligned beneath the body lugs, otherwise pressure will not develop within the cooker to any substantial or dangerous level. Secondly, at the end of the cooking process, the cover cannot be rotated to disengage the cover lugs from the body lugs until the pressure in the cooker has been reduced to a safe level.

In the presently preferred embodiment of the invention such structure comprises a locking member slidably mounted on the cover handle and which is manually actuated between an "open" position in which the cover can be rotated to remove or assemble the cover on the cooker body and a "cook" position. The lock member works in conjunction with a pressure-actuated sealing plug which is loosely mounted within a vent opening provided in the cooker cover. The lock member has a catch portion which engages with the cooker body handle in its "cook" position to inhibit relative rotation of the cover and cooker body. It also has an abutment portion which overlies the vent opening when the lock member is in its "open" position, so that the sealing plug cannot rise therethrough and the cooker remains vented to atmosphere. In the "open" position of the lock member, its catch portion is disengaged from the cooker body handle and wherefore the cover can be rotated relative to the cooker to engage or disengage their lugs.

Thus an important feature of the invention is that the lock member must be in its "open" position to permit assembly or removal of the cooker cover. However, the lock member cannot be moved to its "cook" position clear of the vent opening until and unless the handles are properly aligned so that the catch portion can engage in or about the provided portion of the body handle. The handles also are so related to the lugs of the respective cover and body that when the handles are thus properly aligned, so also are the lugs with respect to each other.

A second and equally important feature of the invention is that at the end of the cooking process, the lock member can be moved into its "open" position to permit disengagement of the catch portion with the body handle and thereby permit relative rotation of the cover and body and consequent separation thereof only and unless the pressure within the cooker has been reduced to a safe level.

Other features of the invention include the simplicity of the interlock construction, its mode of operation, and the fact that except for the actuating member the component parts can be concealed beneath the overhang of the cover handle where they cannot be reached for tampering.

As afterwards illustrated the locking member may comprise a single piece of fashioned metal which is conveniently assembled to the cover handle. The structures are both convenient and economical to manufacture and also to assemble.

Many other objects, advantages and features of the invention will be at once apparent or will become so upon further consideration of the preferred embodiment which now will be described in connection with the accompanying drawing.

In said drawing:

FIG. 1. is a side elevational view of a pressure cooker which contains a cover interlock according to the invention;

FIG. 2. is a top plan view of the cooker, a portion of the cover being cut away to illustrate the cover and cooker body lug portions which engage to secure the cover in sealed relation to the cooker body;

FIG. 3. is a sectional view taken along lines 3—3 of FIG. 2, and illustrates the lock member and vent opening with sealing plug of the invention, the locking member being illustrated in its "open" position;

FIG. 4. is a view generally similar to FIG. 3, but shows the lock member in its "cook" position;

FIG. 5. is a sectional view taken along lines 5—5 of FIG. 4, looking in the direction indicated by the arrows;

FIG. 6. is a top plan view of the cover handle partially fragmented and illustrates the top surface of the overhang portion of the cover handle upon which the actuator (not shown) for the lock member slides;

FIG. 7. is a sectional view taken through the actuator along lines 7—7 of Figure, looking in the direction indicated by the arrows; and FIG. 8. is a plan view of the underside of the actuator which slides along the top surface of the cover handle overhang portion illustrated by FIG. 6.

Referring now more specifically to the several views wherein like parts are illustrated by like reference numerals, and first to FIGS. 1. and 2., a pressure cooker identified generally at 10, comprises a generally cylindrical cooker body or vessel 12, having an open top 14 which is closed by a removable circular-shaped cover 16, having a peripherally disposed depending cylindrical flange 18, which surrounds the top edge of the cooker body. The cooker body 12 has a generally horizontal, outwardly projecting handle 20, fixed to the body wall immediately adjacent to the top edge thereof, as by screws 22 (FIG. 3). Diametrically across therefrom, the cooker body optionally may have a second handle 24 fixed thereto and in the drawings is illustrated as of the so called buffet style. Cover 16 also has a generally horizontal outwardly projecting, elongate handle 26 fixed to the flange portion 18 thereof as by screws 28 (FIG. 3). The said cover handle also has an overhang portion 30 which is cavitated on its underside and overlies a peripheral portion of the outer surface 32 of the cover 16.

Considering now FIG. 3 with FIG. 2, the cover flange 18 is shown provided with a plurality of generally equally dimensioned, circumferentially extending, inwardly directed lug portions 34, which are circumferentially separated by generally equi-sized recesses or relieved areas 36. The cooker body 12 in turn, is provided with a similar number of generally equi-sized and spaced, outwardly directed lug portions 38. These are disposed immediately below the upper beveled top edge 40 thereof (FIG. 3). The body lug portions 38 and separating spaces 42 are related to the dimensions of the cover lug portions 34 and their separating spaces 36, that the cover 16 can be assembled over the open top 14 of the cooker body and the cover lug portions 34 lowered through the spaces 42 between the cooker body lug portions 38. Thereafter, the cover is secured to the cooker by rotating it clockwise on the cooker vertical axis in the direction indicated by arrow CL and forcing the cover lug portions 34 beneath the cooker body lugs 38, in which positions, as illustrated by FIG. 3, the cover 16 and its supported gasket 44 are drawn against the beveled edge 40 of the cooker body wall to effect a fluid tight seal between the cover and the cooker body. Preferably, the leading edge of the cooker body lug portions will be slightly tapered to facilitate reception and movement of the cover lug portions there beneath.

In accordance with this invention, when the cover lug portions 34 are centered beneath the body lugs portion 38, the cover handle 26 is also aligned in centered axial relation over the body handle 20 for a purpose hereinafter made clear. To remove the cover and/or to reposition the cover for assembly over the cooker body, the cover handle 26 is rotated counterclock-wise to a position illustrated by phantom lines 26a in FIG. 2. In this position the cover handle has been rotated through an angle sufficient to disengage the cover lug portions 34 from beneath the body lug portions 38 and align them with the separating spaces 42. In this position the cover may be readily lifted from or lowered above the top edge of the cooker body. Preferably, one of the body lug portions 38 and spaces 36 separating the cover flange lug portions 34 are formed outsize (either larger or smaller than the other lug portions and corresponding spaces). Therefore, the cover may be assembled with the cooker body only when the cover handle 26 is in its indicated phantom position 26a.

Disposed centrally of the cover, and establishing communication with the interior of the cooker 10, is a vent pipe 46, on which rests a weighted regulator device 48, said device functioning to maintain a predetermined pressure within the cooker during the cooking or canning process, as is conventional. The cover may also be provided with a conventional pressure release plug 50, which is adapted to be blown from the cover, should pressure within the cooker exceed a predetermined level.

A feature of the disclosed pressure cooker is the novel interlocking means provided which are manually actuatable to interlock the cooker body and cover handles 20, 26, as a condition precedent to operating the cooker in a pressurized state. Cooperating means are brought into play by development of pressure in the cooker which prevent interrupting the interlock when the cover is in a pressurized state.

Considering now FIGS. 3, 4 and 5, said interlock means embodies a lock or locking member 52, which is slidably fixed to the underside 54 of the portion 30 of the cover handle 26 which overhangs the upper side 32 of the cover 16. As illustrated in the said views, said lock member is fashioned of rigid sheet metal stock so as to have a depending generally vertical catch portion 58, and a forward end or abutment portion 60. As illustrated said abutment portion 60 extends generally parallel to the cover handle overhang portion 30 and is wholly confined within the cavity on the underside of the overhang portion. For the purposes of this invention, the abutment portion 60 is considered to be disposed generally horizontal, although factually, to accommodate the curvature of the cover top surface 56 and the underside 54 of the cover handle overhang 30 between which it operates, the said abutment portion may be inclined at some angle other than true horizontal. Abutment portion 60 of the lock member is connected by screw 62 to the stem 64 of a manually operable actuating member 66, which slides across the flat upper surface 68 of the cover handle overhang 30, said stem 64 extending through a provided opening 70, which is sufficiently oversized to accommodate its movement with the lock member 52 between its "open" position (FIG. 3) and its "cook" position (FIG. 4). Movement of the lock member 52 between its "open" and "cook" positions is confined to be essentially radial with respect to the cooker, along the line of the longitudinal axis of the cover handle 26 by spaced parallel guide walls 72 (FIG. 5), which engage on opposed sides of the actuating stem 64.

Considering now FIG. 5 with FIG. 4, it will be seen that catch portion 58 is so shaped and dimensioned that when the lock member 52 is in its "cook" position (FIG. 4), and the elongated handles 20, 26 are actually aligned one over the other, said catch portion fits within a provided recessed area 74 in the upper side of the cooker body handle 20. Its lateral width is only slightly less than the corresponding dimension of said reces 74. Of consequence, the lock member 52 is confined or caught between the opposed upstanding sidewalls 76 of said recess 74, and the handles cannot be rotated; and the cover, therefore, cannot be freed from the cooker body. Furthermore, said lateral dimensions of the catch portions 58 and its receiving recess 74 are such that the catch portion 58 cannot enter said recess except and unless the handles are axially centered with each other. In accordance with this invention, such occurs only when the cover is assembled over the cooker body and its lug portion 34 is properly centered beneath the lug portion 38 of the cooker body. It will be appreciated that alternatively the catch portion 58 of the lock member 52 may be appropriately recessed to engage about provided projections on the cooker body handle to have the same results. Considering now also FIG. 3 with FIG. 4, abutment portion 60 of the lock member has a length such that, in its retracted or "cook" position, it is held firmly by the manual actuator 66 against ridge 78, but short of vent opening 80. In said position of the abutment portion 60, sealing plug 82, shown having a stem 84 loosely riveted in the vent opening 80, is free to rise above the level of the said abutment portion 60. As pressure develops within the cooker, the cap or head 86 of the sealing plug is held thereby in sealing relation against the cover underside and about the vent opening 80, with its stem 84 protruding above the cover surface 56.

Considering now also FIG. 3, it will be seen that the length of abutment portion 60 has also been selected, such that with the plug 82 in its raised position (FIG. 4), the abutment portion 60 will abut the plug stem 84 and the lock member 52 cannot be moved forwardly a distance sufficient to release its catch portion 58 from recess 74. Therefore, the lock member serves to prevent the user from removing the cover from the cooker while its pressure remains at a dangerously high level. However, as soon as the pressure has been reduced to a safe level where it no longer maintains the plug 82 in its FIG. 4 raised position, and allows it to drop to its inactive position, as shown in FIG. 3, the lock member can be moved in its "open" position. In its "open" position as illustrated by FIG. 3, the catch portion 58 is now released from recess 74 of the cooker body handle, but the abutment portion 82 now overlies the vent's opening 80. In this position the abutment prevents rise of the plug and the vent opening 80 cannot be sealed thereby.

Thus in using a pressure cooker equipped with the invention, the cover is assembled over the cooker body and sealed thereto in conventional manner, as by rotating the cover handle 26 from its initial position 26a, into axial alignment with the cooker body handle 20. It is, however, necessary that the manual actuator 66 be initially located so that the locking member 52 is in its "open" position as illustrated by FIG. 3. In this position its abutment portion 60 overlies the vent opening 80 and prevents rise of the sealing plug 82 thereto. In said position its catch portion 58 is also retracted so that the cover can be rotated to locate the cover lug portion 34 beneath the cooker body lug portion 38. However, because the abutment portion 60 overlies the vent opening 80, pressure cannot develop in the cooker. Once the cooker has been rotated through an angle which is sufficient to center cover handle 26 over the cooker body handle 20, the actuator may be relocated to the "cook" position in which position the catch portion 58 is located within the receiving recess 74 of the cooker body handle and the abutment portion 60 has been moved clear of the vent opening 80. In this condition, pressure can develop within the cooker, however, at the end of the cooking process, the cover cannot be removed until after the pressure within the cooker has been lowered to a level which will permit the plug 82 to drop to its FIG. 3 position. Once the pressure in the cooker has been reduced to a safe level, the actuator 66 may be operated to move the lock member to its "open" position which frees its catch portion 58 from the cooker body handle and allows the cover to be removed by the counterclockwise rotation relative to the cooker body.

Preferably, as shown in FIGS. 6 and 7, the underside of the actuator 66 may be provided with spaced recesses 88 which selectively engage with properly located raised detent portions 90 projecting from the outer surface of the overhang 32 over which the actuator slides and thus positively locates the actuator and thereby its connected lock member in their "open" and "cook" positions.

Preferably, also, as illustrated by FIGS. 3 and 4, the vent opening 80 and its sealing plug 82 will be concealed beneath the overhang 30, so as to be inaccessible for tampering while the cooker is in a pressurized state. For this purpose preferably the opposed edges of the cover handle overhang closely engage the outer surface of the cover 16; however, an opening 92 is provided in the forward edge of the overhang for escape of steam from the vent opening 80, which might otherwise be trapped beneath the cover handle overhang. Also, as illustrated by FIG. 5, a suitable access opening 94 may be provided in the catch portion 58 of the lock member to permit tightening and loosening of the screws by which the cover handle 26 is secured to the cover's flange.

From the aforesaid description, it will be appreciated that all of the recited objects, advanges and features of the invention have been demonstrated as obtainable in a highly satisfactory manner.

Thus, having described my invention, I claim:

1. A pressure cooker comprising a body having an open top and a cover which removably seals over said open top, said body and cover each having a handle and means which are brought into engagement with rotation of the cover to a position where the cover and cooker body handles align one over the other to secure the cover to the cooker body in a sealed relation, the cover being rotatable out of said position to a further position where said means disengage to permit assembly and removal of the cover; the cover having a vent opening and a sealing plug loosely supported therein which rises through this vent opening to seal the vent opening with pressure buildup in the cooker, and the cover handle having a movable lock which catches with the cooker body handle in one position when the handles are aligned to inhibit rotation of the cover, the lock being movable to a second position where it is free of the cooker body handle to permit cover rotation, the sealing plug when raised through the vent opening being positioned to bar movement of the lock out of its position where it catches with the cooker body handle.

2. A pressure cooker as claimed in claim 1, wherein the portion of the cooker body handle which catches the lock and the portion of the lock which catches said portion of the cooker body handle portion inhibits movement of said lock out of its second position to catch therewith except when the handles are in a predetermined aligned relation, one over the other.

3. A pressure cooker as claimed in claim 2., wherein the lock when in its second position, overlies the vent opening to inhibit rise of the sealing plug therethrough.

4. A pressure cooker as claimed in claim 1., wherein the lock has an abutment at one end which overlies the vent opening in the second portion of the lock and a catch portion spaced therefrom, which catches with the cooker body handle when the handles are aligned and the lock is moved to its one position.

5. A pressure cooker as claimed in claim 4, wherein the cover handle includes detent means which positively locate the lock in its one and second positions between which it is movable.

6. A pressure cooker as claimed in claim 4, wherein the cooker body handle has a recessed area sized and located to receive the catch portion of the lock only when the handles are in a predetermined aligned relation and the lock is moved to its one position.

7. A pressure cooker as claimed in claim 1, wherein the lock has an actuating portion located exteriorly of the cover handle for manually moving the lock between its one and second positions.

8. A pressure cooker comprising a cooker body having an open top and a horizontal projecting handle fixed thereto adjacent to its open end, a cover which encloses said open top and has a horizontal projecting handle by which the cover may be removably located over the cooker body open top and rotated relative thereto, the cooker body and cover having portions which engage when the cover is rotated to a position where the handles are aligned one over the other to seal the cover to the cooker body over its open top, the cover being rotatable out of said position to disengage said portions and permit removal of the cover, said cover containing a vent opening and a vertically reciprocatable plug having a steam portion loosely mounted in said vent opening and a head portion which is raised into sealing relation about said vent opening with pressure build up to the cover-enclosed cooker body, and a lock member slidably mounted on the cover handle having an abutment portion and a catch portion, said lock member being movable between an "open" position wherein its abutment portion overlies the vent opening and prevents rise of the plug and a "cook" position wherein its abutment portion is clear of the vent opening and its catch portion catches with a portion of the cooker body handle when the handles are in aligned relation.

9. A pressure cooker as claimed in claim 8, wherein the vent opening is located beneath an overhang portion of the cover handle and the lock member is slidably mounted on the underside of the cover handle overhang portion, said overhang portion containing a slot through which the stem of an exteriorly actuated member is connected to the lock member.

10. A pressure cooker as claimed in claim 9, wherein the underside of the actuating member slidably engages the exterior surface of the cover handle overhang and one of said exterior surfaces of the cover handle and underside of the actuating member has a pair of spaced recesses and the other has a detent which selectively engages in one of said recesses to positively locate the lock member in its "open" and "cook" positions.

11. A pressure cooker as claimed in claim 8, wherein the abutment portion of the lock member comprises a generally horizontal end portion thereof and its catch portion comprises a vertically disposed end portion, the cooker body handle having a recessed area to receive said vertically disposed end portion in the "cook" position of the locking member.

12. A pressure cooker as claimed in claim 8, wherein said catch portion of the lock member is so shaped that it can be received within a recessed area of the cooker body handle only when the handles are in a predetermined aligned relation.

* * * * *